(12) United States Patent
Nakayama et al.

(10) Patent No.: US 12,738,800 B2
(45) Date of Patent: Sep. 15, 2026

(54) TERMINAL CONNECTION STRUCTURE OF MOTOR CASING

(71) Applicant: IHI Corporation, Tokyo (JP)

(72) Inventors: Shun Nakayama, Tokyo (JP); Koji Sakota, Tokyo (JP); Yuji Sasaki, Tokyo (JP); Yoshihito Katsu, Tokyo (JP)

( * ) Notice: Subject to any disclaimer, the term of this patent is extended or adjusted under 35 U.S.C. 154(b) by 206 days.

(21) Appl. No.: 18/540,875

(22) Filed: Dec. 15, 2023

(65) Prior Publication Data

US 2024/0120800 A1 Apr. 11, 2024

Related U.S. Application Data

(63) Continuation of application No. PCT/JP2022/019077, filed on Apr. 27, 2022.

(30) Foreign Application Priority Data

Aug. 26, 2021 (JP) ................................ 2021-137823

(51) Int. Cl.
*H02K 5/22* (2006.01)

(52) U.S. Cl.
CPC .................................. *H02K 5/225* (2013.01)

(58) Field of Classification Search
CPC ..................................................... H02K 5/225
See application file for complete search history.

(56) References Cited

U.S. PATENT DOCUMENTS

2005/0001494 A1 1/2005 Kuribayashi et al.
2005/0206256 A1* 9/2005 Reed ........................ H02K 3/50 310/71
2007/0296290 A1 12/2007 Tsukashima et al.
2010/0300797 A1* 12/2010 Reinhart .................. H02K 9/19 903/906
2016/0204529 A1* 7/2016 Imai ....................... H01R 11/12 439/587

FOREIGN PATENT DOCUMENTS

CN 111416466 A * 7/2020 ............... H02K 3/50
JP 6096147 * 5/1985

(Continued)

OTHER PUBLICATIONS

Liang, Machine Translation of CN111416466, Jul. 2020 (Year: 2020).*

(Continued)

*Primary Examiner* — Eric Johnson
(74) *Attorney, Agent, or Firm* — SHIPWAY IP

(57) ABSTRACT

A terminal connection structure of a motor casing configured to house an AC motor of a plurality of phases, the terminal connection structure includes a plurality of terminal blocks located side by side to each other along a circumferential direction of the motor casing and including a plurality of terminal surfaces facing away from the motor casing, and a plurality of terminals that penetrate the terminal blocks and are configured to be electrically connected to the phases of the AC motor. A portion of each of the terminals is located on the terminal surfaces. At least one terminal surface is offset in a perpendicular direction from a plane aligned with another terminal surface of the plurality of terminal surfaces.

18 Claims, 4 Drawing Sheets

(56) References Cited

FOREIGN PATENT DOCUMENTS

| | | | | | |
|---|---|---|---|---|---|
| JP | H4-088356 | | | 7/1992 | |
| JP | H10243601 | A | * | 9/1998 | |
| JP | 2003-134725 | | | 5/2003 | |
| JP | 2004-048864 | | | 2/2004 | |
| JP | 2004056924 | A | * | 2/2004 | |
| JP | 2005-027413 | | | 1/2005 | |
| JP | 2005-229754 | | | 8/2005 | |
| JP | 2010-110035 | | | 5/2010 | |
| JP | 2011-000961 | | | 1/2011 | |
| JP | 2014-103834 | | | 6/2014 | |
| JP | 2015-160529 | | | 9/2015 | |
| JP | 2015-216762 | | | 12/2015 | |
| JP | 2018126056 | A | * | 8/2018 | |
| JP | 2019-055691 | | | 4/2019 | |
| JP | 2020157959 | A | * | 10/2020 | ........... B60K 17/043 |

OTHER PUBLICATIONS

Tamura, Machine Translation of JP2018126056, Aug. 2018 (Year: 2018).*

Taiko, Machine Translation of JP2020157959, Oct. 2020 (Year: 2020).*

Hoshi, Machine Translation of JP10243601, Sep. 1998 (Year: 1998).*

Yomo, Machine Translation of JP2004056924, Feb. 2004 (Year: 2004).*

Kawada, Machine Translation of JP6096147, May 1985 (Year: 1985).*

International Preliminary Report on Patentability with Written Opinion dated Mar. 7, 2024 for PCT/JP2022/019077.

International Search Report dated Jul. 5, 2022 for PCT/JP2022/019077.

* cited by examiner

TERMINAL CONNECTION STRUCTURE OF MOTOR CASING

CROSS-REFERENCE TO RELATED APPLICATIONS

This application is a continuation application of PCT Application No. PCT/JP2022/019077, filed on Apr. 27, 2022, which claims the benefit of priority from Japanese Patent Application No. 2021-137823, filed on Aug. 26, 2021. The entire contents of the above listed PCT and priority applications are incorporated herein by reference.

BACKGROUND

Field

The present disclosure relates to a terminal connection structure of a motor casing and a rotating machine.

Description of the Related Art

Japanese Unexamined Patent Publication No. H4-88356, No. 2003-134725, No. 2010-110035, No. 2011-961 and No. 2015-216762 disclose terminal connections. For example, a terminal is connected to each phase of a three-phase AC motor, and a cable is connected to each terminal. AC currents of phases shifted by 120° are supplied to the phases of the three-phase AC motor. The AC motor is housed in a motor casing, and the motor casing is provided with a terminal connection structure. A terminal block that holds a terminal is provided in the terminal connection structure.

SUMMARY

A plurality of terminals are connected to different cables, and an AC current is supplied from each cable to each phase of the AC motor. A plurality of terminal blocks provided on the motor casing are associated with the phases of the AC motor. Thus, each of the plurality of terminals are installed on an appropriate terminal block.

Disclosed herein is an example terminal connection structure of a motor casing configured to house an AC motor of a plurality of phases. The terminal connection structure may include a plurality of terminal blocks provided on the motor casing, a plurality of terminals connected to the phases of the AC motor in a current-passable way and penetrating the terminal blocks, and a plurality of terminal surfaces being outer end surfaces of the plurality of terminal blocks, the terminals being exposed from the terminal surfaces. The plurality of terminal surfaces may be provided side by side along a direction intersecting the rotation axis of the AC motor, and a height differential is provided at least between one terminal surface and another terminal surface in a radial direction of the motor casing. The direction intersecting the rotation axis is, for example, a direction orthogonal to the rotation axis.

An example rotating machine may include an AC motor of a plurality of phases configured to rotate a rotating shaft and a motor casing configured to house the AC motor. The AC motor may include a rotor fixed to the rotating shaft and a stator surrounding the rotor. The motor casing may include a plurality of terminal blocks, a plurality of terminals connected to the phases of the AC motor in a current-passable way and penetrating the terminal blocks, and a plurality of terminal surfaces being outer end surfaces of the plurality of terminal blocks, the terminals being exposed from the terminal surfaces. The plurality of terminal surfaces may be provided side by side along a direction intersecting the rotation axis of the AC motor, and a height differential is provided at least between one terminal surface and another terminal surface in a radial direction of the motor casing. The direction intersecting the rotation axis is, for example, a direction orthogonal to the rotation axis.

DETAILED DESCRIPTION

Figure 1:
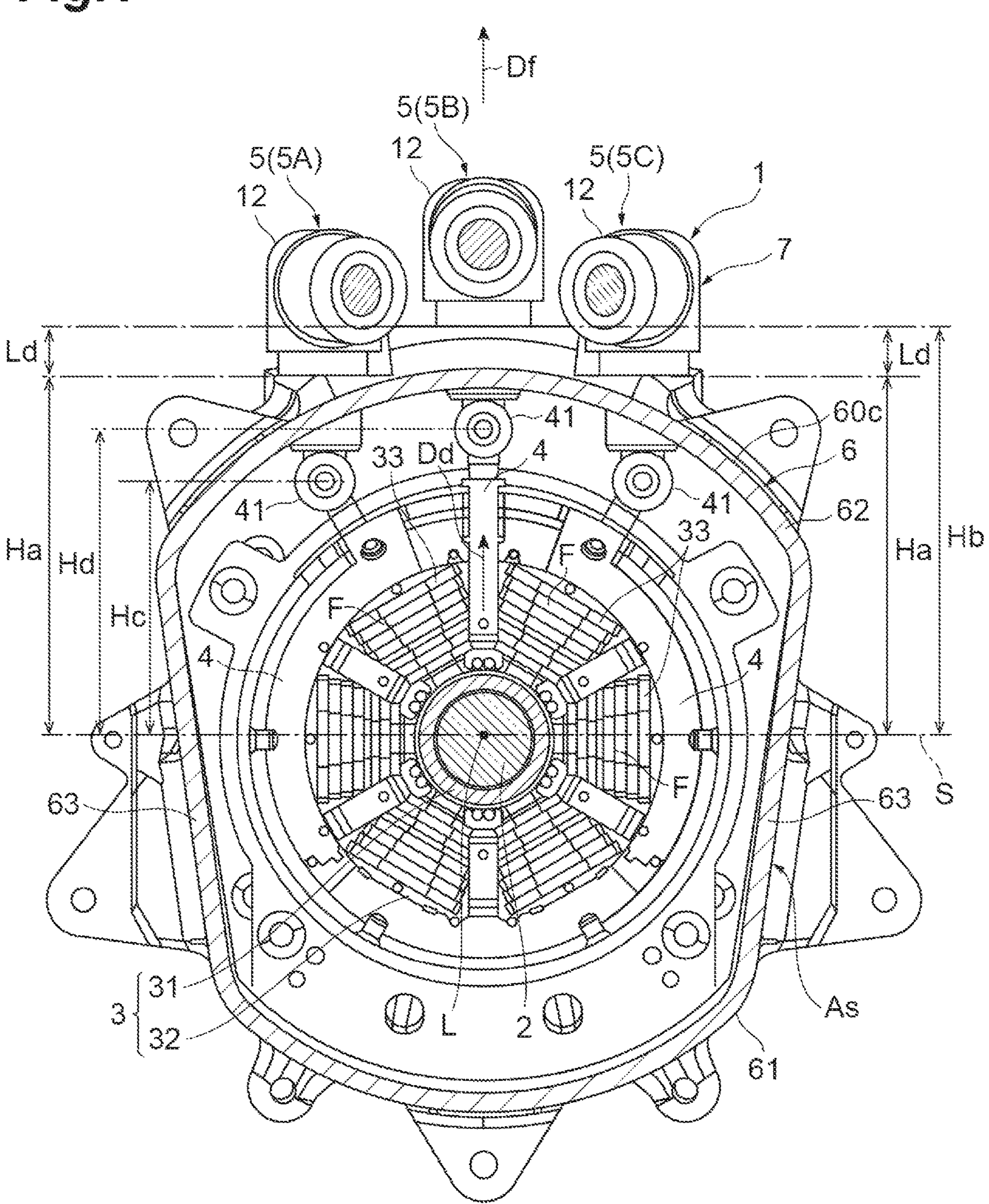
FIG. 1 is a front view illustrating an example rotating machine.

Example terminal connection structures of a motor casing that houses an AC motor of a plurality of phases are disclosed herein. The terminal connection structure may include a plurality of terminal blocks located on the motor casing, a plurality of terminals connected to the phases of the AC motor in a current-passable way and penetrating the terminal blocks, a plurality of terminal surfaces that are outer end surfaces of the plurality of terminal blocks and from which the terminals are exposed. The plurality of terminal surfaces may be located side by side along a direction intersecting the rotation axis of the AC motor, and a height differential is provided at least between one terminal surface and another terminal surface in a radial direction of the motor casing. The direction intersecting the rotation axis is, for example, a direction orthogonal to the rotation axis.

In some examples, each of the plurality of terminal blocks may have a terminal surface from which the terminal is exposed. The plurality of terminal surfaces may be located side by side along a direction intersecting the rotation axis of the AC motor. Therefore, a dimensional increase due to the arrangement of a plurality of terminal blocks in the rotation axis direction may be suppressed. Further, a height differential may be located between one terminal surface and another terminal surface in a radial direction of the motor casing. With the height differential, the plurality of terminal blocks may be readily discerned in a visual way.

In some examples, the AC motor is a three-phase AC motor, and the plurality of terminal surfaces include a first terminal surface, a second terminal surface, and a third terminal surface. The second terminal surface may be located between the first terminal surface and the third terminal surface, and each of the plurality of terminals includes a plug extending to penetrate the terminal block. The plurality of plugs extend in the same direction. A reference plane may include the rotation axis, and is orthogonal to the extending direction of the plug. The heights from the reference plane to the first terminal surface and the third terminal surface are equal. The height from the reference plane to the second terminal surface may be higher than the height from the reference plane to the first terminal surface and the third terminal surface. In some examples, by providing a height differential such that the second terminal surface at the center is higher than the first terminal surface and the third terminal surface, all the terminal blocks may be readily discerned.

In some examples, the terminal connection structure may include a plurality of bus bars connected to the phases of the AC motor and arranged along the outer periphery of a stator of the AC motor. Each of the plurality of terminals may include a plug extending to penetrate the terminal block. Each of the plurality of bus bars may include a terminal connection section connected to the plug. The plurality of terminal connection sections may be arranged in different positions in the circumferential direction of the stator. The reference plane may include a rotation axis, and is orthogonal to the extending direction of the plug. The difference in height from the reference plane to terminal connection sections may be offset by the height differential, and the lengths of the plurality of plugs are the same. The plurality of bus bars may be arranged in different positions in the circumferential direction of the stator. In some examples, even if there is a difference in height between terminal connection sections with respect to the reference plane, the difference may be offset by the height differential between terminal blocks. It may not be necessary to prepare plugs having different lengths to correspond to the plurality of terminal blocks, and plugs having the same length can be used and the plug can be commonly applied. Accordingly, an error in attachment of the plug to the terminal block and the like can be prevented.

In some examples, the terminal may include a plug extending to penetrate the terminal block, and a plug mounting section made of resin that is mounted on the outer periphery of the plug and fills in a gap between the plug and the terminal block. In some examples, by using the plug mounting section to fill in a gap between the plug and the terminal block, an event where liquid or the like enters the motor casing from the outside through a gap of the terminal block may be prevented.

In some examples, the terminal may include a cap section surrounding a connection portion between a cable and the plug. The cap section may include a cable mounting section extending in a direction bending from the extending direction of the plug and externally mounted on the cable. In some example, by using the cap section to surround a connection portion between the cable and the plug, the connection portion may be protected.

In some examples, the terminal connection structure may include a plurality of cables and a plurality of cable mounting sections externally mounted on the plurality of cables. The plurality of cable mounting sections may extend in directions bending from the extending directions of the plugs and in directions in which the plurality of cables converge. In some examples, since each of the cable mounting sections extends in a direction in which the cables converge, the plurality of cables may be readily collected.

In some examples having a terminal connection structure of a motor casing that houses an AC motor of a plurality of phases, the terminal connection structure may include a plurality of terminal blocks provided on the motor casing and a plurality of terminals connected to the phases of the AC motor in a current-passable way and penetrating the terminal blocks. At least one terminal block of the plurality of terminal blocks adjacent to each other may be provided to protrude with respect to another terminal block adjacent to each other.

In some examples, the terminal block protruding with respect to the other terminal block may form a height differential with respect to the other terminal block, and may have a side surface avoiding the terminal provided on the other terminal block.

An example rotating machine may include an AC motor of a plurality of phases that rotates a rotating shaft, and a motor casing that houses the AC motor. The AC motor may include a rotor fixed to the rotating shaft and a stator surrounding the rotor. The motor casing may include a plurality of terminal blocks, a plurality of terminal sections connected to the phases of the AC motor in a current-passable way and penetrating the terminal blocks, a plurality of terminal surfaces being outer end surfaces of the plurality of terminal blocks, the terminals being exposed from the terminal surfaces. The plurality of terminal surfaces may be located side by side along a direction intersecting the rotation axis of the AC motor, and a height differential may be located at least between one terminal surface and another terminal surface in a radial direction of the motor casing. The direction intersecting the rotation axis is, for example, a direction orthogonal to the rotation axis.

In some examples, each of the plurality of terminal blocks has a terminal surface from which the terminal is exposed, and the plurality of terminal surfaces are provided side by side along a direction intersecting the rotation axis of the AC motor. Accordingly, a dimensional increase due to the arrangement of a plurality of terminal blocks in the rotation axis direction may be suppressed. In some examples, a height differential may be located between one terminal surface and another terminal surface in a radial direction of the motor casing. With the height differential, the plurality of terminal blocks may be readily discerned in a visual way. The direction intersecting the rotation axis is, for example, a direction orthogonal to the rotation axis.

In the following description, with reference to the drawings, the same reference numbers are assigned to the same components or to similar components having the same function, and overlapping description is omitted.

FIG. 1 illustrates an example rotating machine 1 (e.g., an electric turbocharger). The rotating machine 1 includes motor assembly 6. The motor assembly 6 includes an AC motor 3 of a plurality of phases F, a rotating shaft 2 that rotates by the driving of the AC motor 3, and an inverter that controls the driving of the AC motor 3. The AC motor 3 may be applicable to a two-phase or four or more-phase AC motor.

The AC motor 3 includes a rotor 31 fixed to the rotating shaft 2 and a stator 32 placed to surround the rotor 31. The stator 32 includes three-phase coils 33 wound around teeth. The three-phase coil 33 is connected to a terminal 5 via a bus bar 4 in a conductive plate-like form. Hereinafter, with a rotation axis L of the AC motor 3 as a reference, a side that is nearer to the terminal 5 than the rotation axis L is described as an upper side or above, and a portion placed on the upper side is described as an upper portion. Further, a side on the opposite side to the upper side with respect to the rotation axis L is described as a lower side or under, and a portion placed on the lower side is described as a lower portion.

The motor assembly As includes motor casing 6 housing the AC motor 3. The motor casing 6 includes motor casing 6 made by a metal. The motor casing 6 surrounds the stator 32. The motor casing 6 has a substantially tubular body including a first end portion 60*a* and a second end portion 60*b* opposite the first end portion 60*a* in a direction along the rotation axis L (hereinafter, a rotation axis direction Da). The motor casing 6 has the length in the rotation axis direction Da is shorter than the width in a direction orthogonal to the rotation axis L. The length of the motor casing 6 between the first end portion 60*a* and the second end portion 60*b* may be shorter than the distance from the rotation axis L to the outer circumferential surface 60*c* of the motor casing 6.

The motor casing 6 includes a lower wall section 61, an upper wall section 62, and a pair of side wall sections 63. When the motor casing 6 is viewed from the rotation axis direction Da (see FIG. 1), for example, in a frontal view, the lower wall section 61 is a wall section having an arc-like cross section placed to run along a lower portion of the stator 32. The upper wall section 62 is a wall section having an arc-like cross section placed on the opposite side to the lower wall section 61 and placed to run along an upper portion of the stator 32. The arc length of the upper wall section 62 is longer than the arc length of the lower wall section 61. The side wall section 63 is a flat plate-like wall section erected from the lower wall section 61 toward the upper wall section 62. The pair of side wall sections 63 are inclined such that the distance therebetween gradually increases from a lower end connected to the lower wall section 61 to an upper end connected to the upper wall section 62.

The upper wall section 62 is provided with a terminal connection structure 7. The terminal connection structure 7 includes a plurality of terminal blocks 8 (e.g., a first terminal block, a second terminal block and a third terminal block) that hold the terminals 5 (e.g., a first terminal, a second terminal and a third terminal). The plurality of terminal blocks 8 is located between the first end portion 60*a* and the second end portion 60*b* of the motor casing 6. The number of terminal blocks 8 corresponds to the number of phases F of the AC motor 3. For example, three terminal blocks 8 are provided in three positions in correspondence with the three-phase AC motor 3. In the terminal block 8, an assembling hole 81 penetrating to communicate the inside and the outside of the motor casing 6 is formed. The terminal 5 is mounted on the terminal block 8 in such a way as to be fitted into the assembling hole 81. The terminal 5 includes a plug 10 (see FIG. 4) extending to penetrate the terminal block 8 in a state of being mounted in the assembling hole 81. The plurality of plugs 10 (e.g., a first plug, a second plug and a third plug) of the plurality of terminals 5 are installed such that the longitudinal directions are the same direction, for example, the extending directions Db (see FIG. 2) penetrating the terminal blocks 8 are the same. The first plug 10, the second plug 10 and the third plug 10 extend in parallel directions. The first plug 10, the second plug 10 and the third plug 10 may have approximately equal length.

The terminal block 8 is provided to protrude from a convexly curved outer circumferential surface 60*c* of the upper wall section 62. A distal end (outer end surface) of the terminal block 8 is a terminal surface 9, and is provided with an opening that is the upper end of the assembling hole 81. The terminal surface 9 face away from the motor casing 6. The terminal surface 9 is a substantially flat surface, and a portion of the terminal 5 is exposed from the terminal surface 9. The portion of the plug 10 is located on the terminal surface 9. When the terminal connection structure 7 is viewed from above (see FIG. 3), for example, in a planar view, the plurality of terminal surfaces 9 are arranged along a direction Dc intersecting the rotation axis L. The direction Dc intersecting the rotation axis L is, for example, a direction orthogonal to the rotation axis L. A height differential Ld is formed between adjacent terminal surfaces 9 (see FIGS. 1 and 2). The height differential Ld may mean that there is a difference in distance in a radial direction Dd with respect to the rotation axis L. A reference plane S passes through the rotation axis L and is perpendicular to the parallel directions of the plugs 10. The height differential Ld may mean that there is a difference in distance (height) from the reference plane S. The plurality of terminals 5 illustrated in FIGS. 1 and 2, protrude in the same direction (hereinafter, a protruding direction Df), and in some examples a plane orthogonal to the protruding direction Df and including the rotation axis L may be considered as the reference plane S. A height of the second terminal surface 9B from the reference plane S is greater than a height of the first terminal surface 9A and the third terminal surface 9C from the reference plane S.

In a frontal view (see FIGS. 1 and 2), the plurality of terminal blocks 8 are, in order from the left, a first terminal block 8A, a second terminal block 8B, and a third terminal block 8C. The second terminal block 8B is placed between the first terminal block 8A and the third terminal block 8C. The second terminal block 8B protrudes further away from the outer circumferential surface 60*c* compared to the first terminal block 8A and the third terminal block 8C. The distance (height Ha) from the reference plane S to the terminal surface 9 (a first terminal surface 9A) of the first terminal block 8A and the distance (height Ha) from the reference plane S to the terminal surface 9 (a third terminal surface 9C) of the third terminal block 8C are equal. The second terminal block 8B at the center protrudes further than the first terminal block 8A and the third terminal block 8C. The second terminal block 8B protrudes with respect to the first terminal block 8A in a direction away from the rotation axis L. The distance (height Hb) from the reference plane S to the terminal surface 9 (a second terminal surface 9B) of the second terminal block 8B is higher than the height Ha of the first terminal surface 9A and the third terminal surface 9C. The second terminal surface 9B is offset in a perpendicular direction from a plane aligned with the first terminal surface 9A and the third terminal surface 9C. The perpendicular direction may correspond to the radial direction Dd.

In some examples, the second terminal block 8B can be distinguished from the first terminal block 8A and the third terminal block 8C. Further, although the heights Ha of the first terminal block 8A and the third terminal block 8C are equal, the first terminal block 8A and the third terminal block 8C can be distinguished by placing the second terminal surface 9B between the first terminal block 8A and the third terminal block 8C. The protruding direction Df of the second terminal block 8B coincides with the radial direction Dd connecting the rotation axis L and the second terminal block 8B. Also the first terminal block 8A and the third terminal block 8C protrude in the same direction as the second terminal block 8B, and the radial direction Dd and the protruding direction Df are substantially the same. If the plurality of terminal blocks 8 protrude in different directions, the radial direction Dd can be described as a radius direction or a centrifugal direction from the rotation axis L toward each terminal block 8.

Figure 4:
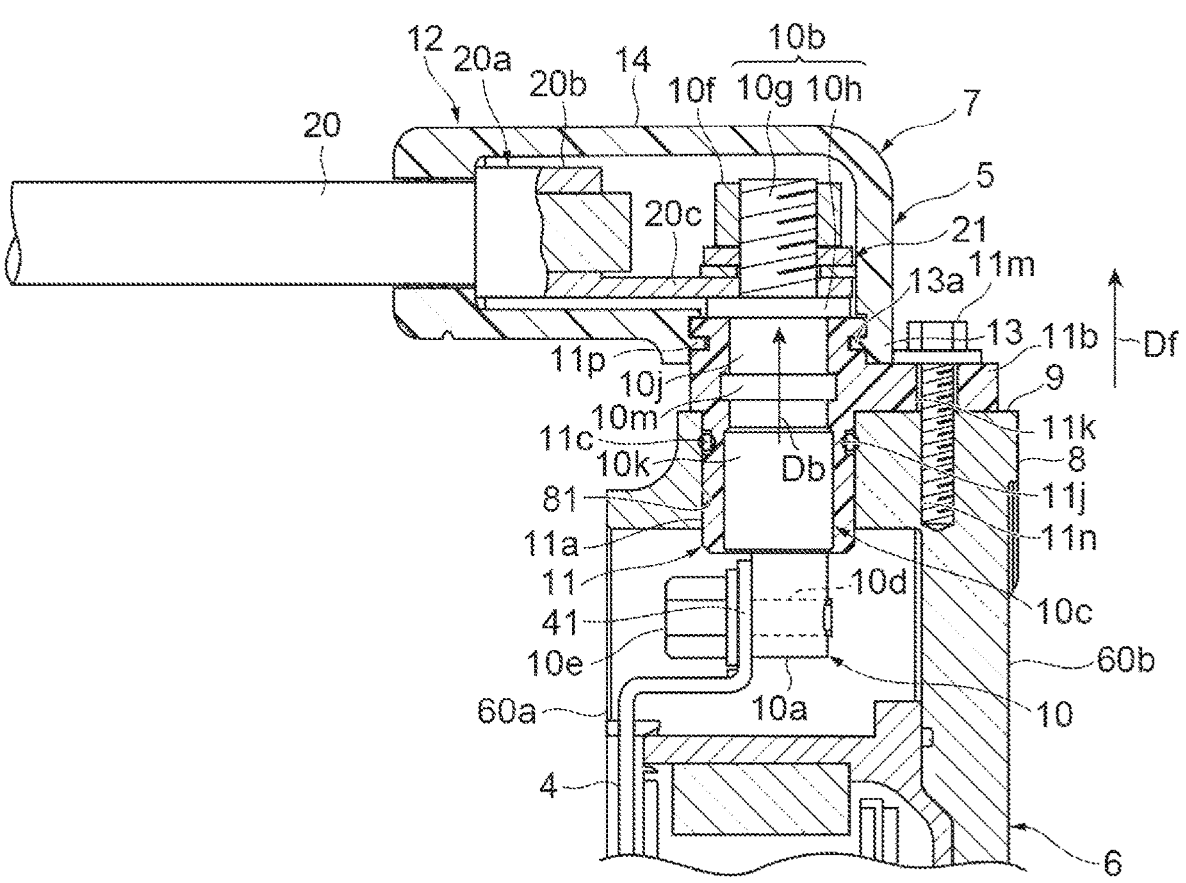
FIG. 4 is a cross-sectional view taken along line IV-IV of FIG. 3.

As shown in FIG. 4, the terminal 5 includes a plug 10 made of a current-passable metal and having a shaft shape (rod shape), a plug mounting section 11 made of resin (having electrical insulation properties) and mounted on the outer periphery of the plug 10, and a cap section 12 made of resin and attached to the plug mounting section 11. In some examples, the plurality of terminals 5 have the same structure and dimensions, and are commonly applied. Hereinbelow, one terminal 5 is described in detail as a representative.

The plug 10 includes: a lower contact section 10*a* connected to the bus bar 4; an upper contact section 10*b* connected to a cable terminal 20*a*; and a body section 10*c* provided between the lower contact section 10*a* and the upper contact section 10*b*. A screw hole 10*d* illustrated in FIG. 4, is formed in the lower contact section 10*a*. The plug 10 is fixed to a terminal connection section 41 of the bus bar 4 by a bolt 10*e* (fastening member) screwed into the screw hole 10*d*.

The upper contact section 10*b* includes: a shaft section 10*g* onto which a nut 10*f* (fastening section) is screwed and to which the cable terminal 20*a* is fastened; and a flange section 10*h* that protrudes from the shaft section 10*g* and that the cable terminal 20*a* is in contact with. The cable terminal 20*a* illustrated in FIG. 4, is a round terminal, and includes a caulking section 20*b* pressure-bonded to an end portion of a cable 20 and an annular section 20*c* attached to the upper contact section 10*b* in a current-passable way. The annular section 20*c* is passed through by the shaft section 10*g* and is in contact with the flange section 10*h*, and is fixed to the flange section 10*h* by fastening with the nut 10*f*.

The body section 10*c* is surrounded by the plug mounting section 11. The body section 10*c* includes an upper body section 10*j* close to the upper contact section 10*b* and a lower body section 10*k* close to the lower contact section 10*a*, and a collar section 10*m* engaged with the plug mounting section 11 is provided on the outer periphery of the upper body section 10*j*. The collar section 10*m* interferes with the plug mounting section 11 to prevent the plug mounting section 11 from shifting in the longitudinal direction of the body section 10*c*. The inner diameter of the lower body section 10*k* is larger than the inner diameter of the upper body section 10*j*.

The plug mounting section 11 is mounted to surround the outer periphery of the body section 10*c*. The plug mounting section 11 includes: a tubular main body section 11*a* surrounding the body section 10*c*; a plate-like locking section 11*b* protruding from the outer periphery of the main body section 11*a*; and a seal member 11*c* mounted on the main body section 11*a*. A groove in which the collar section 10*m* is accommodated and an enlarged diameter region having an enlarged inner diameter corresponding to the lower body section 10*k* are provided on the inner periphery of the main body section 11*a*.

A lower portion of the main body section 11*a* is a portion inserted into the assembling hole 81 of the terminal block 8. There is a slight gap between the main body section 11*a* and the terminal block 8, specifically, between the outer peripheral surface of the main body section 11*a* and the inner peripheral surface of the assembling hole 81. In order to fill in this gap, an annular seal member 11*c* such as an O-ring is installed. A holding groove 11*j* for holding the seal member 11*c* in a fixed position is formed on the outer peripheral surface of the main body section 11*a*.

An upper portion of the main body section 11*a* and the locking section 11*b* are portions exposed from the terminal surface 9 to the outside. A free fitting hole 11*k* illustrated in FIG. 4, is formed in the locking section 11*b*. A fastening member 11*m* such as a bolt passed through the free fitting hole 11*k* is screwed into a screw hole 11*n* of the terminal block 8. As a result, the locking section 11*b* is fastened by the fastening member 11*m*, and is fixed to a predetermined position on the terminal surface 9. A locking groove 11*p* in which a locking piece 13*a* of the cap section 12 is accommodated is formed on the outer periphery of the upper portion of the main body section 11*a*.

The cap section 12 is attached to the plug mounting section 11, and surrounds a connection portion 21 between the cable 20 and the plug 10. The cap section 12 includes an annular neck section 13 mounted on the outer periphery of an upper portion of the plug mounting section 11. A locking piece 13*a* accommodated in and integrated with the locking groove 11*p* of the plug mounting section 11 is provided on the inner periphery of the neck section 13. The cap section 12 includes a tubular cable mounting section 14 bending and extending from the neck section 13 and externally mounted on the cable 20. The cable terminal 20*a* fixed to an end portion of the cable 20 is accommodated in the cable mounting section 14. The cable terminal 20*a* is connected to the upper contact section 10*b* of the plug 10 in a current-passable way in the cap section 12. The cable 20 is connected to an inverter that controls the driving of the AC motor 3.

The cable mounting section 14 extends in a direction bending from the extending direction Db of the plug 10. Each of the plurality of cap sections 12 includes the cable mounting section 14, and different cables 20 are mounted on the cable mounting sections 14. The plurality of cable mounting sections 14 extend in directions in which the plurality of cables 20 converge. The cable mounting section 14 extends in a direction intersecting an extending direction of the plug 10 and externally mounted on the cable 20. Additional description of an example terminal connection structure will now be given with reference to FIG. 3.

Figure 3:
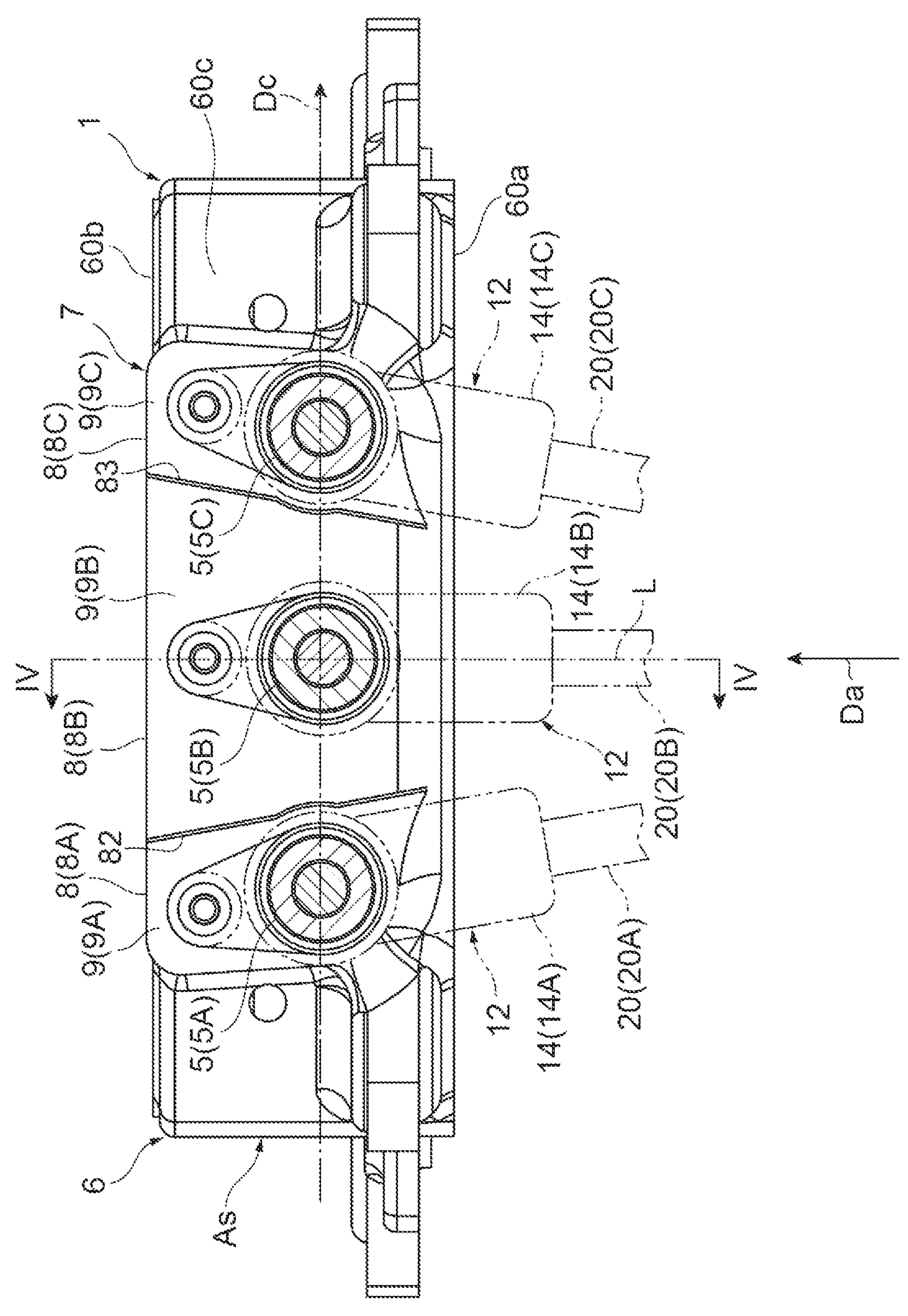
FIG. 3 is a plan view of an example terminal connection structure.

In the terminal connection structure 7 illustrated in FIG. 3, the plurality of cable mounting sections 14 viewed from the above, are arranged on the same plane. Here, a first cable mounting section 14A is mounted on a first cable 20A. The first cable 20A is connected to a first terminal 5A held by the first terminal block 8A. A second cable mounting section 14B is mounted on a second cable 20B. The second cable 20B is connected to a second terminal 5B held by the second terminal block 8B. A third cable mounting section 14C is mounted on a third cable 20C. The third cable 20C is connected to a third terminal 5C held by the third terminal block 8C.

When the second cable 20B at the center is taken as a reference, the first cable 20A is inclined to approach the second cable 20B as the distance from the first terminal 5A increases. The first cable mounting section 14A and the second cable mounting section 14B extend in directions in which the first cable 20A and the second cable 20B intersect each other and converge. Further, the third cable 20C is inclined to approach the second cable 20B as the distance from the third terminal 5C increases. The third cable mounting section 14C and the second cable mounting section 14B extend in directions in which the third cable 20C and the second cable mounting section 14B intersect each other and converge. The first cable mounting section 14A, the second cable mounting section 14B and the third mounting section 14C extend in converging directions that intersect extending directions of the plugs 10.

Although the second cable 20B is taken as a reference in FIG. 3, the second cable 20B and the third cable 20C may also be arranged to converge to the first cable 20A in some examples. Further, the plurality of cables 20 may be two or four or more cables 20. In other examples, some, a plurality, or all of the cables 20 may be grouped together to converge to one place, or arranged as separate groups that converge to different places.

In some examples in which a plurality of cables 20 extend in converging directions, the second terminal block 8B at the center protrudes with respect to the first terminal block 8A and the third terminal block 8C adjacent to the second terminal block 8B. The second terminal block 8B has a first side surface 82 adjacent to the first terminal block 8A and a second side surface 83 adjacent to the third terminal block 8C. The first side surface 82 is not parallel to the longitudinal direction in which the second cable mounting section 14B extends, but is inclined to run along the longitudinal direction of the first cable mounting section 14A and avoids interference with the first cable mounting section 14A. Further, the second side surface 83 is not parallel to the longitudinal direction of the second cable mounting section 14B, but is inclined to run along the longitudinal direction of the third cable mounting section 14C and avoids interference with the third cable mounting section 14C. The first side surface 82 is formed to avoid the first terminal 5A, and the first side surface 82 is formed to avoid the second terminal 5B. The first side surface 82 does not contact the first terminal 5A and the second side surface 83 does not contact the third terminal 5C.

Figure 2:
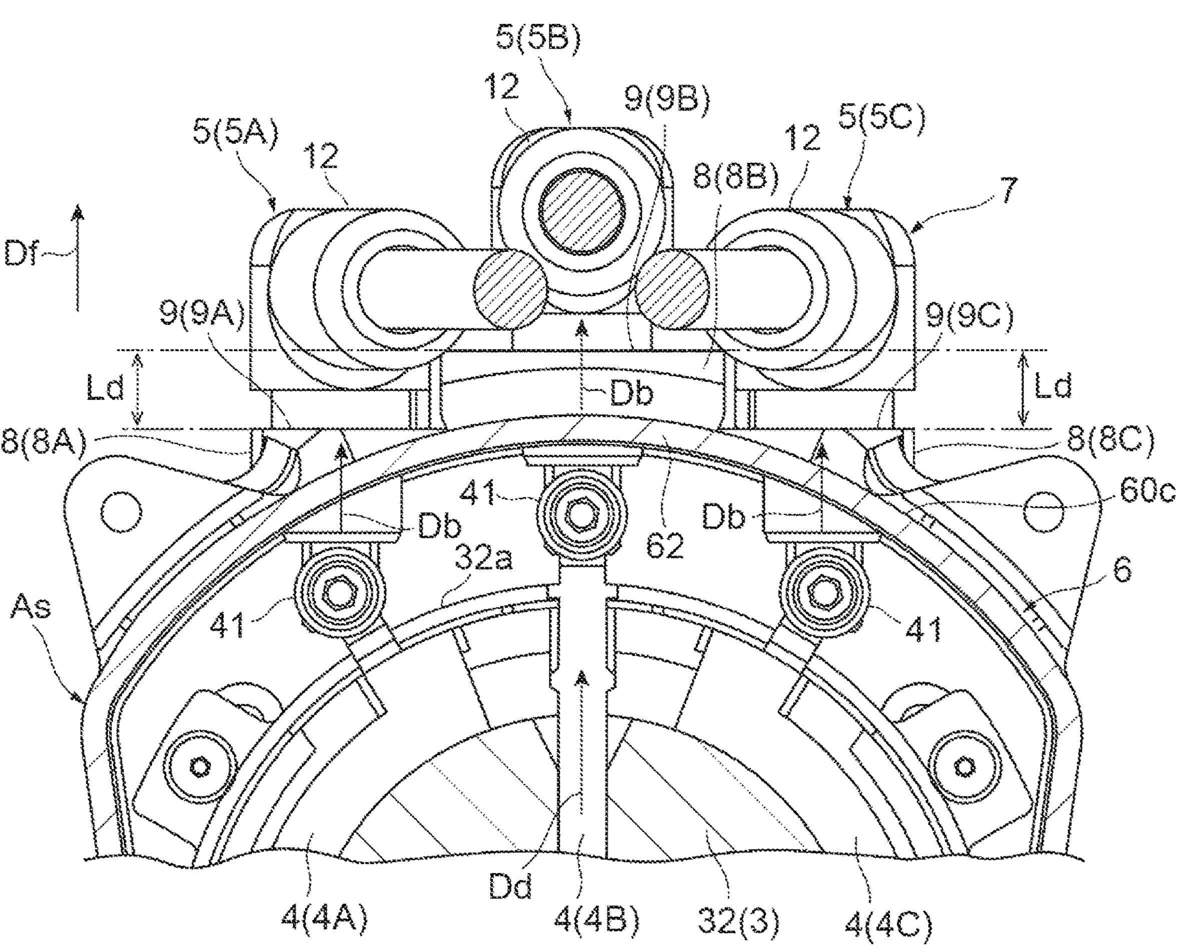
FIG. 2 is an enlarged view of an example terminal connection structure.

Next, an example connection between the plurality of terminals 5 and the stator 32 is described. As shown in FIGS. 1 and 2, the AC motor 3 includes three (a plurality of) bus bars 4 arranged along the outer periphery 32*a* of the stator 32. Each of the plurality of bus bars 4 is connected to a coil 33 forming each phase F of the AC motor 3. Each bus bar 4 includes an annular terminal connection section 41. The terminal connection section 41 is provided to protrude from a position along the outer periphery 32*a* of the stator 32 in a radius direction of the motor stator (a centrifugal direction about the rotation axis L), and is connected to the plug 10 of the terminal 5 (see FIG. 4). The plurality of bus bars 4 includes a first bus bar 4A including a first terminal connection section 41, a second bus bar 4B including a second terminal connection section 41 and a third bus bar 4C including a third terminal connection section 41.

As shown in FIG. 1, the terminal connection sections 41 of the bus bars 4 are connected to different terminals 5. The terminal connection section 41 (e.g., a first terminal connection section) of a first bus bar 4A may be connected to the first terminal 5A (e.g., the first plug 10), the terminal connection section 41 (e.g., a second terminal connection section) of the second bus bar 4B is connected to the second terminal 5B (e.g., the second plug 10), and the terminal connection section 41 (e.g., a third terminal connection section) of a third bus bar 4C is connected to the third terminal 5C (e.g., the third plug 10).

The plurality of terminal connection sections 41 are arranged in different positions in the circumferential direction of the stator 32, and there is a difference in height from the reference plane S. For example, the first terminal connection section 41, the second terminal connection section 41 and the third terminal connection section 41 are spaced apart along the outer periphery of the stator 32. With respect to a reference plane S passing through the rotation axis L and orthogonal to the extending direction Db of the plug 10, the height Hc from the reference plane S to the first terminal connection section 41 of the first bus bar 4A and the height Hc to the third terminal connection section 41 of the third bus bar 4C are equal. On the other hand, the height Hd from the reference plane S to the second terminal connection section 41 of the second bus bar 4B is higher than height Hc. There may be a difference in height between terminal connection sections 41 with respect to the reference plane S. Although comparison and verification have been made while the center of the terminal connection section 41 is taken as the position of the terminal connection section 41 because the terminal connection section 41 is annular, comparison and verification can be made also while the lower or upper end of the terminal connection section 41 is taken as the position of the terminal connection section 41.

As described above, the second terminal 5B is connected to the terminal connection section 41 of the second bus bar 4B, and the second terminal 5B is held by the second terminal block 8B. The second terminal block 8B protrudes in a radial direction Dd more than the first terminal block 8A and the third terminal block 8C. A height differential Ld (e.g., a first height differential) is formed between the second terminal block 8B and the first terminal block 8A. The first height differential Ld offsets the difference between the height Hd of the second terminal connection section 41 of the second bus bar 4B and the height Hc of the first terminal connection section 41 of the first bus bar 4A. A height differential Ld (e.g., a second height differential) is formed between the second terminal block 8B and the third terminal block 8C. The second height differential Ld offsets the difference between the height Hd of the second terminal connection section 41 of the second bus bar 4B and the height He of the third terminal connection section 41 of the third bus bar 4C. By using the height differentials Ld to offset a difference in height between terminal connection sections 41, the dimensional difference in a region where the terminals 5 are held by the terminal blocks 8 can be eliminated. As a result, plugs 10 having the same structure and the same dimension (length) can be used in a plurality of terminals 5, and the plug 10 can be commonly applied.

The distance from the rotation axis L to the terminal connection section 41 of the first bus bar 4A and the distance from the rotation axis L to the terminal connection section 41 of the third bus bar 4C are equal. On the other hand, the distance from the rotation axis L to the terminal connection section 41 of the second bus bar 4B is longer than the above distance.

An offset distance between the second terminal surface 9B and the first terminal surface 9A is substantially equal to an offset distance between a height of the first terminal connection section 41 from the reference plane S and a height of the second terminal connection section 41 from the reference plane (S). An offset distance between the second terminal surface 9B and the third terminal surface 9A is substantially equal to an offset distance between a height of the third terminal connection section 41 from the reference plane S and a height of the second terminal connection section 41 from the reference plane (S).

The plurality of terminal surfaces 9 of the terminal connection structure 7, the first terminal surface 9A, the second terminal surface 9B, and the third terminal surface 9C may be provided side by side along a direction Dc intersecting the rotation axis L of the AC motor 3. The direction Dc intersecting the rotation axis L is, for example, a direction orthogonal to the rotation axis L. Thus, as compared to a case where a plurality of terminal blocks 8 are arranged in the rotation axis direction Da, a dimensional increase due to the arrangement of a plurality of terminal blocks 8 can be suppressed. Further, a height differential Ld is provided between the second terminal surface 9B (one terminal surface 9), and the first terminal surface 9A and the third terminal surface 9C (other terminal surfaces 9) in a radial direction Dd of the motor casing 6. With the height differential Ld, the plurality of terminal blocks 8 may be readily discerned in a visual way. As a result, the plurality of terminal blocks 8 may be readily discerned while a dimensional increase of the motor casing 6 in the rotation axis direction Da is suppressed.

Further, the plurality of terminals 5 are connected to the phases F of the AC motor 3, and are supplied with AC currents of the different phases F. Thus, an appropriate terminal 5 corresponding to each phase may be installed on each of the plurality of terminal blocks 8. By virtue of the facilitation of distinction between terminal blocks 8, an appropriate terminal 5 can be installed on the terminal block 8, and an electrical connection error when connecting the cable 20 via the terminal 5 can be prevented.

Further, the heights Ha from the reference plane S to the first terminal surface 9A and the third terminal surface 9C are equal, and the height Hb from the reference plane S to the second terminal surface 9B is higher than the first terminal surface 9A and the third terminal surface 9C. A height differential Ld is provided such that the second terminal surface 9B at the center is higher than the first terminal surface 9A and the third terminal surface 9C, and the second terminal block 8B at the center is conspicuous. As a result, the first terminal block 8A may be readily discerned while comparison with the second terminal block 8B is performed, and the third terminal block 8C may be readily discerned while comparison with the second terminal block 8B is performed. Thus, all the terminal blocks 8 may be readily discerned.

The terminal connection sections 41 of the plurality of bus bars 4 are arranged in different positions in the circumferential direction of the stator 32. There is a difference in height from the reference plane S between the plurality of terminal connection sections 41; this difference is offset by the height differential Ld, and the lengths of the plugs 10 of the plurality of terminals 5 are the same. Thus, plugs having the same lengths may be provided for the plurality of terminal blocks 8, and the plug 10 may be commonly applied. On the other hand, in a case where plugs having different lengths are installed according to a plurality of terminal blocks, appropriate plugs having matching dimensions are selected at the time of installation, out of consideration for preventing a plug attachment error. By commonly applying the plug 10, a structural error in attachment of the plug 10 can be essentially eliminated.

Further, since a plug mounting section 11 made of resin that fills in a gap between the plug 10 and the terminal block 8 is provided, an event where liquid or the like enters the motor casing 6 from the outside through a gap of the terminal block 8 can be prevented.

Further, since a cap section 12 is provided, a connection portion 21 between the cable 20 and the plug 10 can be protected from external factors. Further, each of the plurality of cap sections 12 includes a cable mounting section 14, and each of the cable mounting sections 14 extends in a direction in which the plurality of cables 20 converge. As a result, the plurality of cables 20 may be readily collected.

Further, in a rotating machine 1 including the above terminal connection structure 7, a plurality of terminal blocks 8 may be readily discerned while a dimensional increase of the motor casing 6 in the rotation axis direction Da is suppressed. By virtue of the facilitation of distinction between terminal blocks 8, an appropriate terminal 5 can be installed on the terminal block 8, and an electrical connection error when connecting the cable 20 via the terminal 5 can be prevented.

It is to be understood that not all aspects, advantages and features described herein may necessarily be achieved by, or included in, any one particular example. Indeed, having described and illustrated various examples herein, it should be apparent that other examples may be modified in arrangement and detail. An example rotating machine, the present disclosure may be widely applied to rotating machines that rotate by the driving of an AC motor, and the rotating machine may also be, for example, an electric assist turbocharger or the like.

Some additional examples are disclosed as follows, with continued reference to the drawings for convenience of description.

An example terminal connection structure (7) of a motor casing (6) configured to house an AC motor (3) of a plurality of phases (F), the terminal connection structure (7) includes a plurality of terminal blocks (8) located side by side to each other along a circumferential direction of the motor casing (6) and including a plurality of terminal surfaces (9) facing away from the motor casing, and a plurality of terminals (5) that penetrate the terminal blocks (8) and are configured to be electrically connected to the phases (F) of the AC motor (3). A portion of each of the terminals (5) is located on the terminal surfaces (9). At least one terminal surface (9) is offset in a perpendicular direction from a plane aligned with another terminal surface of the plurality of terminal surfaces (9).

The AC motor (3) may be a three-phase AC motor (3). The plurality of terminal surfaces (9) may include a first terminal surface (9A), a second terminal surface (9B), and a third terminal surface (9C). The second terminal surface (9B) may be located between the first terminal surface (9A) and the third terminal surface (9C). The second terminal surface (9B) may be offset in the perpendicular direction from the plane aligned with both the first terminal surface (9A) and the third terminal surface (9C).

The perpendicular direction may correspond to a radial direction of the motor casing.

The plurality of terminal blocks (8) may include a first terminal block (8A), a second terminal block (8B) and a third terminal block (8C). The second terminal block (8B) may be located between the first terminal block (8A) and the third terminal block (8C), and protrude away from both the first terminal block (8A) and the third terminal block (8C) in the radial direction.

The plurality of terminal blocks (8) may include a first terminal block (8A) and a second terminal block (8B). The plurality of terminals (5) may include a first terminal (5A) and a second terminal (5B). The first terminal (5A) may include a first plug (10) extending to penetrate the first terminal block (8A). The second terminal (5B) may include a second plug (10) extending to penetrate the second terminal block (8B). The first plug (10) and the second plug (10) may extend in a parallel direction.

Each of the plurality of terminals (5) may include a plug (10) extending to penetrate the terminal block (8) and a plug mounting section (11) made of resin, mounted on an outer periphery of the plug (10), and filling in a gap between the plug (10) and the terminal block (8).

Each of the plurality of the terminals (5) may include a cap section (12) surrounding a connection portion (21) between a cable (20) and the plug (10). The cap section (12) may include a cable mounting section (14) extending in a direction intersecting an extending direction of the plug (10) and externally mounted on the cable (20).

The terminal connection structure (7) may include a plurality of cables (20) and a plurality of cable mounting sections (14) externally mounted on the plurality of cables (20). The plurality of cable mounting sections (14) may extend in converging directions that intersect extending directions of the plugs (10).

An example motor assembly (As) may include an AC motor (3) having a plurality of phases, a motor casing (6) that houses the AC motor (3), a plurality of terminal blocks (8) located side by side to each other on an outer circumferential surface (60*c*) of the motor casing (6) and a plurality of terminals (5) electrically connected to the phases (F) of the AC motor (3) and separately penetrating the terminal blocks (8). At least one terminal block of the plurality of terminal blocks may protrude further away from the outer circumferential surface (60*c*) of the motor casing (6) compared to another terminal block of the terminal blocks.

The motor assembly (As) may include a rotating shaft (2) that is rotated by the AC motor (3). The motor casing (6) may include a first end portion (60*a*) and a second end portion (60*b*) opposite the first end portion (60*a*) in an axial direction along the rotating shaft (2). The plurality of terminal blocks (8) may be located between the first end portion (60*a*) and the second end portion (60*b*).

A length of the motor casing (6) between the first end portion (60*a*) and the second end portion (60*b*) may be shorter than a distance from a rotation axis (L) of the rotating shaft (2) to the outer circumferential surface (60*c*).

The plurality of terminal blocks (8) may comprise a first terminal block (8A) including a first terminal surface (9A) and a second terminal block (8B) including a second terminal surface (9B). The plurality of terminals (5) may comprise a first terminal (5A) including a first plug (10) extending to penetrate the first terminal block (8A), and a second terminal (5B) including a second plug, (10) extending to penetrate the second terminal block (8A). The first plug (10) and the second plug (10) may extend in parallel directions.

The first terminal block (8A) may include a first terminal surface (9A) on which a portion of the first plug (10) is located. The second terminal block (8B) may include a second terminal surface (9B) on which a portion of the first plug (10) is located. A reference plane (S) passes through a rotation axis (L) of the AC motor (3) and is perpendicular to the parallel directions of the first plug (10) and the second plug (10). A height of the second terminal surface (9B) from the reference plane (S) may be greater than a height of the first terminal surface (9A) from the reference plane (S).

The motor assembly (As) may include a stator (32) of the AC motor (3) and a plurality of bus bars (4) separately connected to the phases (F) of the AC motor (3), and arranged along an outer periphery of the stator (32). The plurality of bus bars (4) may have a first bus bar (4) including a first terminal connection section (41) connected to the first plug (10) and a second bus bar (4) including a second terminal connection section (41) connected to the second plug (10). The first terminal connection section (41) and the second terminal connection section (41) may be spaced apart along the outer periphery of the stator (32).

An offset distance between the second terminal surface (9B) and the first terminal surface (9A) may be substantially equal to an offset distance between a height of the first terminal connection section (41) from the reference plane (S) and a height of the second terminal connection section (41) from the reference plane (S). The first plug and the second plug may have approximately equal lengths.

The plurality of terminal blocks (8) includes a first terminal block (8A) and a second terminal block (8B). The plurality of terminals (5) may include a first terminal (5A) penetrating the first terminal block (8A) and a second terminal (5B) penetrating the second terminal block (8B). The second terminal block (8B) may protrude further away from the outer circumferential surface (60*c*) compared to the first terminal block (8A). The second terminal block (8B) may have a side surface (82) that does not contact the first terminal (5A).

The plurality of terminal blocks (8) includes a first terminal block (8A), a second terminal block (8B) and a third terminal block (8C). The plurality of terminals (5) may include a first terminal (5A) penetrating the first terminal block (8A), a second terminal (5B) penetrating the second terminal block (8B) and a third terminal (5C) penetrating the third terminal block (8C). The second terminal (5B) may be located between the first terminal block (8A) and the third terminal block (8C). The first terminal block (8A) may include a first terminal surface (9A) on which a portion of the first terminal (5A) is located. The second terminal block (8B) may include a second terminal surface (9B) on which a portion of the second terminal (5B) is located. The third terminal block (8C) may include a third terminal surface (9C) on which a portion of the third terminal (5C) is located. The second terminal surface (9A) may be located further away from a rotation axis (L) of the AC motor (3) than both the second terminal surface (9B) and the third terminal surface (9C).

An example rotating machine (1) may include an AC motor (3) having a plurality of phases, a rotating shaft (2) that is rotated by the AC motor and a motor casing (6) that houses the AC motor (3). The AC motor (3) may include a rotor (31) fixed to the rotating shaft (2) and a stator (32) surrounding the rotor (31). The motor casing (6) may include a plurality of terminal blocks (8) located on an outer circumferential surface (60*c*) of the motor casing (6) and including a plurality of terminal surfaces (9) facing away from the motor casing (6) and a plurality of terminals (5) that separately penetrate the terminal blocks (8) and are electrically connected to the phases of the AC motor (3). A portion of each of the terminals (5) is located on the terminal surfaces (9). At least one terminal surface of the plurality of terminal surfaces (9) is offset in a radial direction of the rotating shaft (2) from another terminal surface of the terminal surfaces (9).

The motor casing (6) may include a first end portion (60*a*) and a second end portion (60*b*) opposite the first end portion (60*a*) in an axial direction along the rotating shaft (2). The plurality of terminal blocks (8) may be located between the first end portion (60*a*) and the second end portion (60*b*).

The AC motor (3) may be a three-phase AC motor (3). The plurality of terminal blocks (8) may include a first terminal block (8A), a second terminal block (8B) and a third terminal block (8C). The second terminal block (8B) may be located between the first terminal block (8A) and the third terminal block (8C). The second terminal block (8B) may protrude further away from the outer circumferential surface (60*c*) compared to both the first terminal block (8A) and the third terminal block (8C).

height differential

What is claimed is:

1. A terminal connection structure of a motor casing configured to house an AC motor of a plurality of phases, the terminal connection structure comprising:

- a plurality of terminal blocks located side by side to each other along a circumferential direction of the motor casing and including a plurality of terminal surfaces facing away from the motor casing;
- inverter cables configured to connect the AC motor to an inverter; and
- a plurality of terminals that penetrate the terminal blocks and are configured to electrically connect the inverter cables to the phases of the AC motor,
- wherein each of the terminals includes:
  - a plug that protrudes from one of the terminal surfaces in an extending direction;
  - a cable mounting section that positions one of the inverter cables along a longitudinal direction which intersects the extending direction; and
  - a plug mounting section made of resin, located on an outer periphery of the plug, and filling in a gap between the plug and a terminal block, wherein at least one terminal surface is offset in a perpendicular direction from a plane aligned with another terminal surface of the plurality of terminal surfaces, and wherein a plurality of the inverter cables extend from a plurality of cable mounting sections in longitudinal directions that converge toward a single point, and wherein the plug mounting section includes:

a tubular main body located between the plug and the terminal block; and a plate-like locking portion protruding from the outer periphery of the main body and fixed on said one of the terminal surfaces.

2. The terminal connection structure according to claim 1, wherein the AC motor is a three-phase AC motor, wherein the plurality of terminal surfaces includes a first terminal surface, a second terminal surface, and a third terminal surface, wherein the second terminal surface is located between the first terminal surface and the third terminal surface, and wherein the second terminal surface is offset in the perpendicular direction from a plane aligned with both the first terminal surface and the third terminal surface.

3. The terminal connection structure according to claim 1, wherein the perpendicular direction corresponds to a radial direction of the motor casing.

4. The terminal connection structure according to claim 3, wherein the plurality of terminal blocks includes a first terminal block, a second terminal block and a third terminal block, wherein the second terminal block is located between the first terminal block and the third terminal block, and protrudes away from both the first terminal block and the third terminal block in the radial direction.

5. The terminal connection structure according to claim 1, wherein the plurality of terminal blocks includes a first terminal block and a second terminal block, wherein the plurality of terminals includes a first terminal and a second terminal, wherein the first terminal includes a first plug extending to penetrate the first terminal block, wherein the second terminal includes a second plug extending to penetrate the second terminal block, and wherein the first plug and the second plug extend in parallel directions.

6. The terminal connection structure according to claim 1, wherein each of the inverter cables includes a cable terminal which connects to an upper contact section of the plug, and wherein the cable terminal is covered by the cable mounting section.

7. The terminal connection structure according to claim 6, wherein the cable terminal for each of the inverter cables extends in one of the longitudinal directions of the inverter cables.

8. The terminal connection structure according to claim 1, wherein the AC motor is a three-phase AC motor, wherein the plurality of terminal blocks includes a center terminal block, a first adjacent terminal block and a second adjacent terminal block, wherein the center terminal block is located between the first adjacent terminal block and the second adjacent terminal block, and wherein the center terminal block protrudes further away from an outer circumferential surface of the motor casing in a radial direction compared to both the first adjacent terminal block and the second adjacent terminal block.

9. The terminal connection structure according to claim 8, wherein the plurality of terminals includes a center terminal that penetrates the center terminal block, a first adjacent terminal that penetrates the first adjacent terminal block, and a second adjacent terminal that penetrates the second adjacent terminal block, and wherein the center terminal block includes a first side surface facing the cable mounting section of the first adjacent terminal, and a second side surface facing the cable mounting section of the second adjacent terminal.

10. The terminal connection structure according to claim 9, wherein the first side surface is along the longitudinal direction of the inverter cable which is positioned by the cable mounting section of the first adjacent terminal, and wherein the second side surface is along the longitudinal direction of the inverter cable which is positioned by the cable mounting section of the second adjacent terminal.

11. The terminal connection structure according to claim 8, wherein the plurality of terminals includes a center terminal that penetrates the center terminal block, and an adjacent terminal that penetrates the first adjacent terminal block, wherein the center terminal block includes a side surface facing the cable mounting section of the adjacent terminal, and wherein the side surface is inclined with respect to the longitudinal direction of the inverter cable positioned by the cable mounting section of the center terminal.

12. A motor assembly comprising:

an AC motor having a plurality of phases;

a motor casing that houses the AC motor;

a plurality of terminal blocks located side by side to each other on an outer circumferential surface of the motor casing;

a plurality of terminals configured to electrically connect a plurality of electrical cables to the phases of the AC motor and separately protrude from the terminal blocks, a stator of the AC motor; and a plurality of bus bars separately connected to the phases of the AC motor, and arranged along an outer periphery of the stator, wherein a center terminal block of the plurality of terminal blocks protrudes further away from the outer circumferential surface of the motor casing in a radial direction compared to two adjacent terminal blocks, wherein a center terminal that protrudes from the center terminal block is configured to position one electrical cable parallel to a rotation axis direction of the AC motor, the center terminal block comprises a center terminal surface, and the center terminal includes a center plug extending to penetrate the center terminal surface, wherein two adjacent terminals that protrude from the two adjacent terminal blocks are configured to position two other electrical cables along longitudinal directions that converge toward a single point that appears to intersect the rotation axis direction when viewed from the radial direction, wherein the two adjacent terminal blocks comprise a first adjacent terminal block including a first adjacent terminal surface and a second adjacent terminal block including a second adjacent terminal surface, wherein the two adjacent terminals comprise a first adjacent terminal including a first adjacent plug extending to penetrate the first adjacent terminal surface, and a second adjacent terminal including a second adjacent plug extending to penetrate the second adjacent terminal surface, wherein the center plug, the first adjacent plug and the second adjacent plug extend in parallel directions, wherein a reference plane passes through a rotation axis of the AC motor and is perpendicular to the parallel directions of the center plug, the first adjacent plug and the second adjacent plug, wherein the plurality of bus bars comprise a center bus bar including a center terminal connection section connected to the center plug, a first adjacent bus bar including a first adjacent terminal connection section connected to the first adjacent plug, and a second adjacent bus bar including a second adjacent terminal connection section connected to the second adjacent plug, wherein an offset distance between the center terminal surface and the first adjacent terminal surface is substantially equal to an offset distance between a height of the center terminal connection section from the reference plane and a height of the first adjacent terminal connection section from the reference plane, and wherein an offset distance between the center terminal surface and the second adjacent terminal surface is substantially equal to an offset distance between the height of the center terminal connection section from the reference plane and a height of the second adjacent terminal connection section from the reference plane.

13. The motor assembly according to claim 12, further comprising a rotating shaft that is rotated by the AC motor, wherein the motor casing comprises a first end portion and a second end portion opposite the first end portion in an axial direction along the rotating shaft, and wherein the plurality of terminal blocks is located between the first end portion and the second end portion.

14. The motor assembly according to claim 12, wherein the center terminal connection section, the first adjacent terminal connection section and the second adjacent terminal connection section are spaced apart along the outer periphery of the stator.

15. The motor assembly according to claim 14, wherein the center terminal surface is offset in a perpendicular direction from a plane aligned with the first adjacent terminal surface and the second adjacent terminal surface, wherein both of the first adjacent terminal surface and the second adjacent terminal surface are located on the plane, wherein a height of the center terminal surface from the reference plane is greater than a height of the first adjacent terminal surface from the reference plane, and the height of the center terminal surface is greater than a height of the second adjacent terminal surface from the reference plane, and wherein the center plug, the first adjacent plug and the second adjacent plug have approximately equal lengths.

16. The motor assembly according to claim 12, wherein the center terminal block has a side surface that partially faces one of the two terminals protruding from one of the two adjacent terminal blocks.

17. A motor assembly comprising:

an AC motor having a plurality of phases;

a motor casing that houses the AC motor;

a plurality of terminal blocks located side by side to each other on an outer circumferential surface of the motor casing; and a plurality of terminals configured to electrically connect a plurality of electrical cables to the phases of the AC motor and separately protrude from the terminal blocks, wherein a center terminal block of the plurality of terminal blocks protrudes further away from the outer circumferential surface of the motor casing in a radial direction compared to two adjacent terminal blocks, wherein a center terminal that protrudes from the center terminal block is configured to position one electrical cable parallel to a rotation axis direction of the AC motor, wherein two terminals that protrude from the two adjacent terminal blocks are configured to position two other electrical cables along longitudinal directions that converge toward a single point that appears to intersect the rotation axis direction when viewed from the radial direction, wherein the center terminal includes:

a plug that protrudes from a terminal surface of the center terminal block in an extending direction;

a cable mounting section that positions the one electrical cable along a longitudinal direction which intersects the extending direction; and a plug mounting section connecting the cable mounting section and the plug, and wherein the plug mounting section includes a tubular main body, which partially surrounds the plug and is partially inserted into an assembling hole formed in the center terminal block.

18. The motor assembly according to claim 17, wherein the plug mounting section includes a plate-like locking section protruding from the tubular main body and contacting the terminal surface.

* * * * *